US012425824B2

(12) United States Patent
Voorakkara et al.

(10) Patent No.: US 12,425,824 B2
(45) Date of Patent: Sep. 23, 2025

(54) METHODS AND ARRANGEMENTS FOR A VISUAL INTERFACE PROFILE

(71) Applicant: Intel Corporation, Santa Clara, CA (US)

(72) Inventors: Sridhar Voorakkara, Dublin (IE); Petri Koski, Dublin (IE)

(73) Assignee: Intel Corporation, Santa Clara, CA (US)

( * ) Notice: Subject to any disclaimer, the term of this patent is extended or adjusted under 35 U.S.C. 154(b) by 729 days.

(21) Appl. No.: 17/561,530

(22) Filed: Dec. 23, 2021

(65) Prior Publication Data

US 2022/0201451 A1    Jun. 23, 2022

(51) Int. Cl.
*H04W 4/80* (2018.01)
*H04W 76/10* (2018.01)

(52) U.S. Cl.
CPC ............. *H04W 4/80* (2018.02); *H04W 76/10* (2018.02)

(58) Field of Classification Search
CPC ....... H04W 4/80; H04W 76/10; H04W 12/50; H04W 76/15
See application file for complete search history.

(56) References Cited

U.S. PATENT DOCUMENTS

2016/0100277 A1\* 4/2016 Barabas .................. H04W 4/80
455/41.3
2020/0396681 A1\* 12/2020 Murali .................. H04L 9/0825

\* cited by examiner

*Primary Examiner* — Tuan H Nguyen
(74) *Attorney, Agent, or Firm* — KDW FIRM PLLC

(57) ABSTRACT

Logic to connect with a client device via a Bluetooth (BT) channel. Logic to receive a BT profile comprising a visual profile, the visual profile to describe an application layer feature to visually present a set of BT devices paired with the client device. Logic to present, via a display of the host device, a visual representation of the set of devices. Logic to receive user input associated with the visual representation of the set of devices, the user input indicating selection of a second host device. Logic to cause transmission of a BT frame to the client device to cause the client device to connect to the second BT host. Logic to transmit a BT profile comprising a visual profile. Logic to receive a BT frame to instruct the client device to connect to the second BT host. And logic to connect to a second BT host.

25 Claims, 11 Drawing Sheets

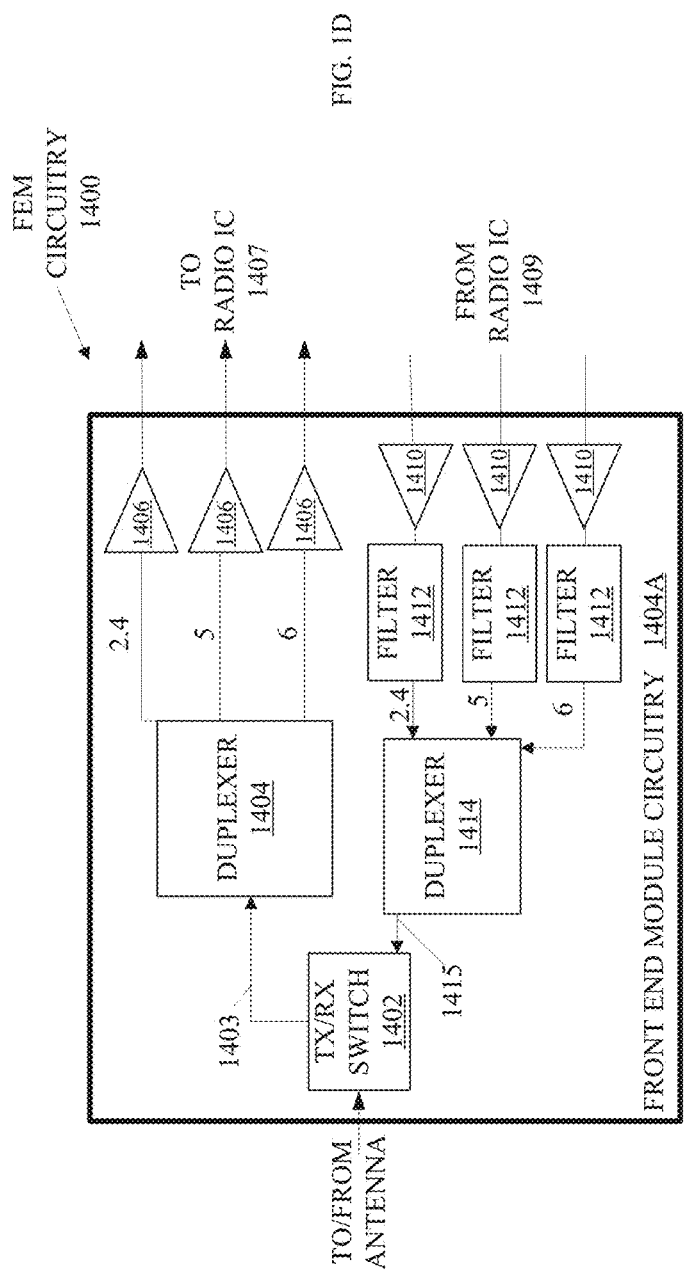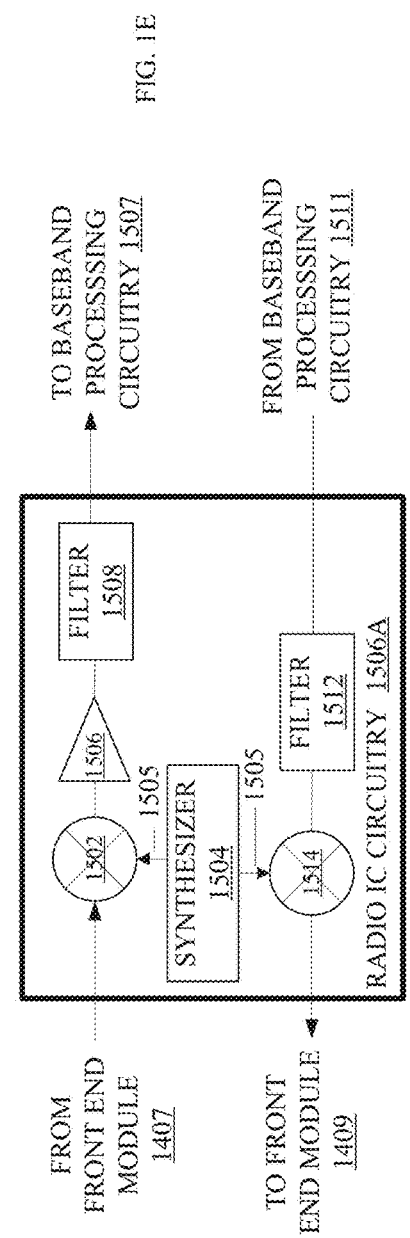

START
                      ↓
    ┌─────────────────────────────────────────┐
    │ CONNECT, BY THE CLIENT DEVICE WITH A    │ ← 4010
    │ HOST DEVICE, VIA A BLUETOOTH (BT)       │
    │ CHANNEL                                  │
    └─────────────────────────────────────────┘
                      ↓
    ┌─────────────────────────────────────────┐
    │ TRANSMIT A BT PROFILE, THE BT PROFILE   │ ← 4015
    │ COMPRISING A VISUAL PROFILE, THE VISUAL │
    │ PROFILE TO DESCRIBE AN APPLICATION       │
    │ LAYER FEATURE TO VISUALLY PRESENT A      │
    │ SET OF BT DEVICES PAIRED WITH THE       │
    │ CLIENT DEVICE                            │
    └─────────────────────────────────────────┘
                      ↓
    ┌─────────────────────────────────────────┐
    │ RECEIVE A BT FRAME, IN ACCORDANCE WITH  │ ← 4020
    │ THE BT PROFILE, FROM THE HOST DEVICE,   │
    │ THE BT FRAME TO INSTRUCT THE CLIENT      │
    │ DEVICE TO CONNECT TO THE SECOND BT HOST │
    └─────────────────────────────────────────┘
                      ↓
    ┌─────────────────────────────────────────┐
    │ RECEIVE A BT FRAME, IN ACCORDANCE WITH  │ ← 4025
    │ THE BT PROFILE, FROM THE HOST DEVICE,   │
    │ THE BT FRAME TO INSTRUCT THE CLIENT      │
    │ DEVICE TO CONNECT TO THE SECOND BT HOST │
    └─────────────────────────────────────────┘
                      ↓
                     END
```

METHODS AND ARRANGEMENTS FOR A VISUAL INTERFACE PROFILE

TECHNICAL FIELD

This disclosure generally relates to systems and methods for wireless communications and, more particularly, to implementing visual interface profiles to facilitate visual selection of host device connections.

BACKGROUND

Bluetooth is a commonly used technology for wireless connectivity between devices. Different functionalities offered via Bluetooth are organized with different profiles. For example, a Bluetooth mouse or a keyboard use Human Interface device Profile (HID) and an audio headset uses a headset profile (HSP).

Many Bluetooth devices do not have a visual user interface, e.g., headset, mouse, keyboard, etc. To improve usability, many of these devices may automatically connect with the last host device with which the client device was connected if that host device is available. In many situations, however, a user may not want to connect to the last host device.

BRIEF DESCRIPTION OF THE DRAWINGS

FIG. 1D illustrates an embodiment of front end module (FEM) circuitry of a wireless interface for STAs, such as the STAs in FIGS. 1A-B, to implement profile logic circuitry.

FIG. 1E illustrates an embodiment of radio integrated circuit (IC) circuitry of a wireless interface for STAs, such as the STAs in FIGS. 1A-B, to implement profile logic circuitry.

FIG. 4 depicts an embodiment of another flowchart to implement profile logic circuitry.

DETAILED DESCRIPTION OF EMBODIMENTS

Figure 1A:
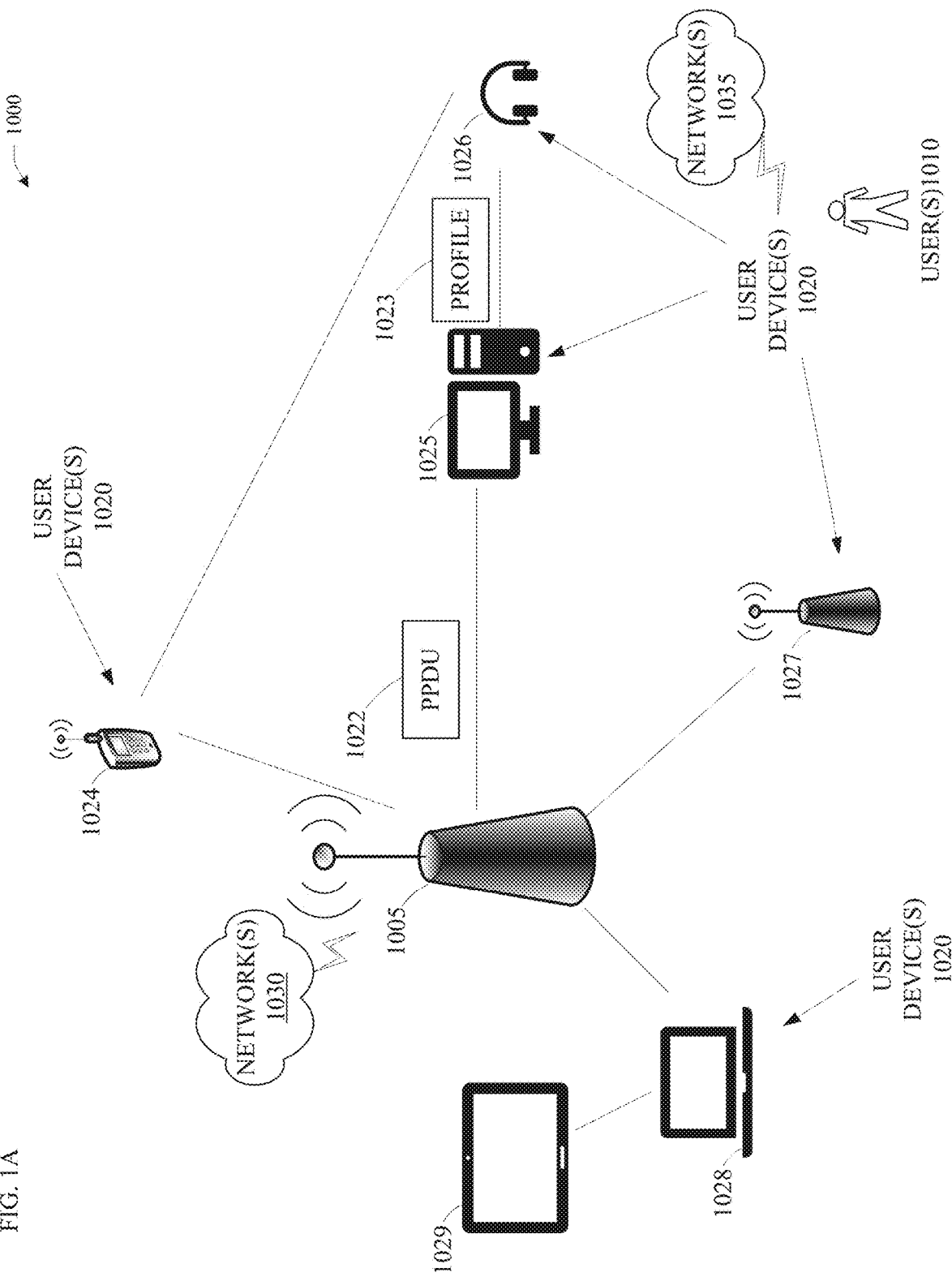
FIG. 1A depicts a system diagram illustrating an embodiment of a network environment for profile logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Many Bluetooth devices do not have a visual user interface, e.g., headset, mouse, keyboard etc. The only way to control these devices is through buttons provided on the devices to control Bluetooth functions.

One of the key aspects of Bluetooth is pairing. This is when two compatible devices share information to begin working together. This usually involves the user confirming connection e.g., by entering a code. Once paired, trust is established, and future connections are established automatically once both devices are free to connect.

Bluetooth devices can have multiple pairings for e.g., a headset can be paired with a PC and when not in use with PC, can be paired and used with a tablet. The headset retains the pairing information for both the devices to be able to automatically connect in future.

In this situation, when the headset is available to connect and both PC and Tablet are also available to accept connections, the headset typically connects to the device it last connected to, i.e., the Tablet. A problem arises when user wants to use the headset with the PC and not the tablet. Headsets do not have any user controls to switch the connection.

Embodiments may comprise profile logic circuitry to add a visual interface profile to Bluetooth. The profile logic circuitry can allow a client device such as the headset to share a visual representation of a set of host device that are currently paired with the client device. The host device may provide a visual interface profile to describe guidelines or host device limitations in terms of, e.g., the screen size and the like for presentation of the visual representation.

In some embodiments, the visual interface profile may include a list of the host devices with which the client device is paired, and the host device may display the list in a Bluetooth connection user interface (UI). In some of these embodiments, the host devices in the list may be activated by a touch on a touch screen on the text item. In other embodiments, the visual interface profile may include or specify icons or other graphics to present the set of the host devices.

With the set of host devices presented visually to the user, the user can easily connect the client device with the correct host device.

In several embodiments, the visual interface profile may be included in Bluetooth (BT) profiles shared when establishing application level connections between the host device and the client device. In further embodiments, the visual interface profile may include settings such as preferences for how a client device operates, default actions, default programs for programmable functions, and/or the like. For instance, a client device such as a headset may only have two or three buttons for an interface. Features of the headset may be accessed by activating a combination of two or more buttons for a length of time. Profile logic circuitry in the client device may provide a visual interface via profile logic circuitry in a host device to allow a user to adjust or customize such programmable features, via a screen/display of the host device.

Many embodiments may further extend features of a client device by facilitating more complex actions that would be very cumbersome or impossible on physical interfaces of some client devices. For instance, the visual interface profile may facilitate the adjustment of a graphic equalizer for a client device such as a headset as well as other settings that may be available on the device, such as finer audio controls.

Having a capability to adjust settings of a Bluetooth device through a host UI advantageously opens possibilities of adding more finer controls to a client device without a requirement to add complex hardware-based controls.

Embodiments may also comprise profile logic circuitry to facilitate communications by devices in accordance with Bluetooth specifications such as Bluetooth Core specifications 5.0, 5.2, and 5.3, as well as older Bluetooth specifications such as 3.0, 4.0, and Bluetooth low energy (LE) specifications. Many embodiments also facilitate communications by devices in accordance with different versions of Institute of Electrical and Electronics Engineers (IEEE) 802.11 standards for wireless communications such as IEEE 802.11-2020, December 2020; IEEE P802.11be™/D1.0, May 2021; IEEE P802.11ax™/D8.0, IEEE P802.11ay™/D7.0, IEEE P802.11az™/D3.0, IEEE P802.11ba™/D8.0, IEEE P802.11bb™/D0.4, IEEE P802.11bc™/D1.02, and IEEE P802.11bd™/D1.1.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with profile logic circuitry such as connecting a client device to a different host device than intended; modifying settings for features and programmable features for a client device without a display; extending the features of a client device without a visual display; transmitting and receiving visual profile information; and/or the like.

Different technical problems such as those discussed above may be addressed by one or more different embodiments. Embodiments may address one or more of these problems associated with assessment. For instance, some embodiments that address problems associated with resource assessment may do so by one or more different technical means, such as, connecting, by a host device with a client device, via a Bluetooth (BT) channel; receiving a BT profile, the BT profile comprising a visual profile, the visual profile to describe an application layer feature to visually present a set of BT devices paired with the client device; presenting, via a display of the host device, a visual representation of the set of devices paired with the client device; receiving user input associated with the visual representation of the set of devices paired with the client device, the user input indicating selection of a second host device; causing transmission of a BT frame, in accordance with the BT profile, to the client device to cause the client device to connect to the second BT host; connecting, by a client device with a host device, via a Bluetooth (BT) channel; transmitting a BT profile, the BT profile comprising a visual profile, the visual profile to describe an application layer feature to visually present a set of BT devices paired with the client device; receiving a BT frame, in accordance with the BT profile, from the host device, the BT frame to instruct the client device to connect to the second BT host; connecting to a second BT host in response to receipt of the BT frame and/or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Some embodiments may facilitate wireless communications in accordance with multiple standards like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A depicts a system diagram illustrating an embodiment of a network environment for profile logic circuitry, in accordance with one or more example embodiments. Wireless network 1000 may include one or more user devices 1020 and one or more access points(s) (AP) 1005, which may communicate in accordance with IEEE 802.11 communication standards. The user device(s) 1020 may comprise mobile devices that are non-stationary (e.g., not having fixed locations) and/or stationary devices.

Figure 3:
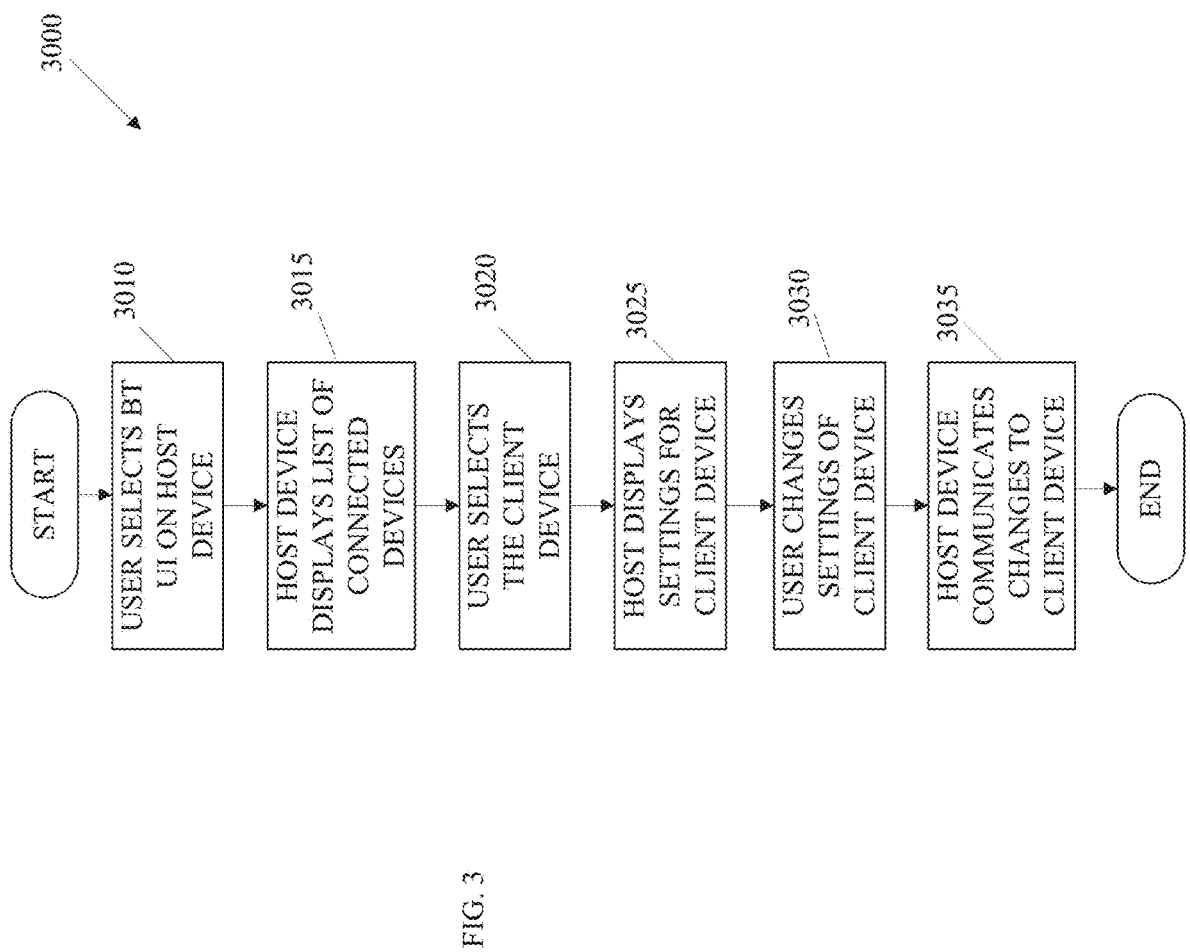
FIG. 3 depicts an embodiment of a flowchart to implement profile logic circuitry.

In some embodiments, the user device(s) 1020 and the AP(s) 1005 may include one or more computer systems similar to that of the functional diagram of FIG. 3 and/or the example machine/system of FIGS. 5, 6, 7, and 8.

One or more illustrative user device(s) 1020 and/or AP(s) 1005 may be operable by one or more user(s) 1010. It should be noted that any addressable unit may be a station (STA). A STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 1020 and the AP(s) 1005 may be STAs. The one or more illustrative user device(s) 1020 and/or AP(s) 1005 may operate as an extended service set (ESS), a basic service set (BSS), a personal basic service set (PBSS), or a control point/access point (PCP/AP). The user device(s) 1020 (e.g., 1024, 1025, 1026, 1027, 1028, or 1029) and/or AP(s) 1005 may include any suitable processor-driven device including, but not limited to, a mobile device or a non-mobile, e.g., a static device. For example, user device(s) 1020 and/or AP(s) 1005 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020 and/or AP(s) 1005 may also include mesh stations in, for example, a mesh network, in accordance with one or more IEEE 802.11 standards and/or 3GPP standards.

Any of the user device(s) 1020 (e.g., user devices 1024, 1025, 1026, 1027, 1028, and 1029) and AP(s) 1005 may be configured to communicate with each other via one or more communications networks 1030 and/or 1035 wirelessly or wired. In some embodiments, the user device(s) 1020 may also communicate peer-to-peer or directly with each other with or without the AP(s) 1005 and, in some embodiments, the user device(s) 1020 may also communicate peer-to-peer if enabled by the AP(s) 1005.

The, user devices 1020 may include, e.g., a client device that is a headset 1026 operating on a Bluetooth (BT) channel and multiple host devices that operate on BT channels as well as Wi-Fi channels. The multiple host devices may include a mobile phone 1024, a computer 1025, a laptop 1028, and a tablet 1029. The headset 1026 may have paired with each of the host devices at different times so the headset may retain security keys for re-establishing connections with the host devices without the need to pair with the host devices again.

In the present embodiment, the headset 1026 may have a setting to automatically re-establish connection with the most recently connected host device available and these user devices may reside in the same room. When the user powers of the headset 1026, the headset 1026 may automatically connect to the computer 1025 even though the user intended to connect the headset 1026 to the mobile phone 1024 to listen to streaming music during exercises.

When the headset 1026 automatically connects with the computer 1025, the headset may exchange BT profiles 1023 with the computer 1025. The BT profiles 1023 may include visual interface profiles. For instance, the visual interface profile of the headset 1026 may include settings/preferences for operation including settings for a graphic equalizer. In the present embodiment, the graphic equalizer may include an option to adjust individual frequency band values or may allow the user to select from a set of graphic equalizer profiles such jazz, rock, classical, news, movie, and/or the like. Furthermore, the visual interface profile of the headset 1026 may include a set of host devices with which the headset 1026 is currently paired.

The user initiates the BT host user interface (UI) on the computer 1025, which offers the user an opportunity to adjust settings for the headset 1026 or to select a new host connection for the headset 1026. The user may open the settings and adjust frequency band amplifications for with a visual graphic equalizer by selecting one of the graphic equalizer profiles such as jazz. The user may then enter the BT connection UI to change to terminate the connection to the computer 1025 and initiate the connection with the mobile phone 1024.

In the BT connection UI of the computer 1025, the BT connection UI may present the user with a list based on the set of host devices with which the headset 1026 is currently paired. In some embodiments, the BT connection UI of the computer 1025 may present a list of the set of host devices. In other embodiments, the BT connection UI of the computer 1025 may correlate the set of host devices with a set of active devices that the computer 1025 detects and present a list of the active host devices with which the headset is paired. In such embodiments, BT connection UI of the computer 1025 may indicate the host devices that do not appear to be active but are included in the set of host devices with which the headset 1026 has paired.

The user may select the mobile phone 1024 from the list of host devices and the profile logic circuitry of the computer 1025 may cause transmission of a BT frame via a link layer controller to the headset 1026 including the setting for the graphic equalizer and the selected host device, the mobile phone 1024. The headset 1026 may store the graphic equalizer setting as the current preference, may terminate the connection with the computer 1025, and may initiate a connection with the mobile phone 1024 via the BT channel.

Any of the communications networks 1030 and/or 1035 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1030 and/or 1035 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1030 and/or 1035 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020 (e.g., user devices 1024, 1025, 1026, 1027, 1028, and 1029) and AP(s) 1005 may include one or more communications antennas. The one or more communications antennas may be any suitable type of antennas corresponding to the communications protocols used by the user device(s) 1020 (e.g., user devices 1024, 1025, 1026, 1027, 1028, and 1029) and AP(s) 1005. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 1020 and/or AP(s) 1005.

Any of the user device(s) 1020 (e.g., user devices 1024, 1025, 1026, 1027, 1028, and 1029) and AP(s) 1005 may be configured to wirelessly communicate in a wireless network. Any of the user device(s) 1020 (e.g., user devices 1024, 1025, 1026, 1027, 1028, and 1029) and AP(s) 1005 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020 (e.g., user devices 1024, 1025, 1026, 1027, 1028, and 1029) and AP(s) 1005 may be configured to perform any given directional transmission towards one or more defined transmit sectors. Any of the user device(s) 1020 (e.g., user devices 1024, 1025, 1026, 1027, 1028, and 1029) and AP(s) 1005 may be configured to perform any given directional reception from one or more defined receive sectors.

MIMO beamforming in a wireless network may be accomplished using RF beamforming and/or digital beamforming. In some embodiments, in performing a given MIMO transmission, user devices 1020 and/or AP(s) 1005 may be configured to use all or a subset of its one or more communications antennas to perform MIMO beamforming.

Any of the user devices 1020 (e.g., user devices 1024, 1025, 1026, 1027, 1028, and 1029) and AP(s) 1005 may include any suitable radio and/or transceiver for transmitting and/or receiving radio frequency (RF) signals in the bandwidth and/or channels corresponding to the communications protocols utilized by any of the user device(s) 1020 and AP(s) 1005 to communicate with each other. The radio components may include hardware and/or software to modulate and/or demodulate communications signals according to pre-established transmission protocols. The radio components may further have hardware and/or software instructions to communicate via Bluetooth protocols such as Bluetooth 5.0 or may communicate via one or more Wi-Fi and/or Wi-Fi direct protocols, as standardized by the Institute of Electrical and Electronics Engineers (IEEE) 802.11 standards. The radio component may include any known receiver and baseband suitable for communicating via the communications protocols. The radio component may further include a power amplifier (PA), a low noise amplifier (LNA), additional signal amplifiers, an analog-to-digital (A/D) converter, one or more buffers, and a digital baseband.

Figure 1B:
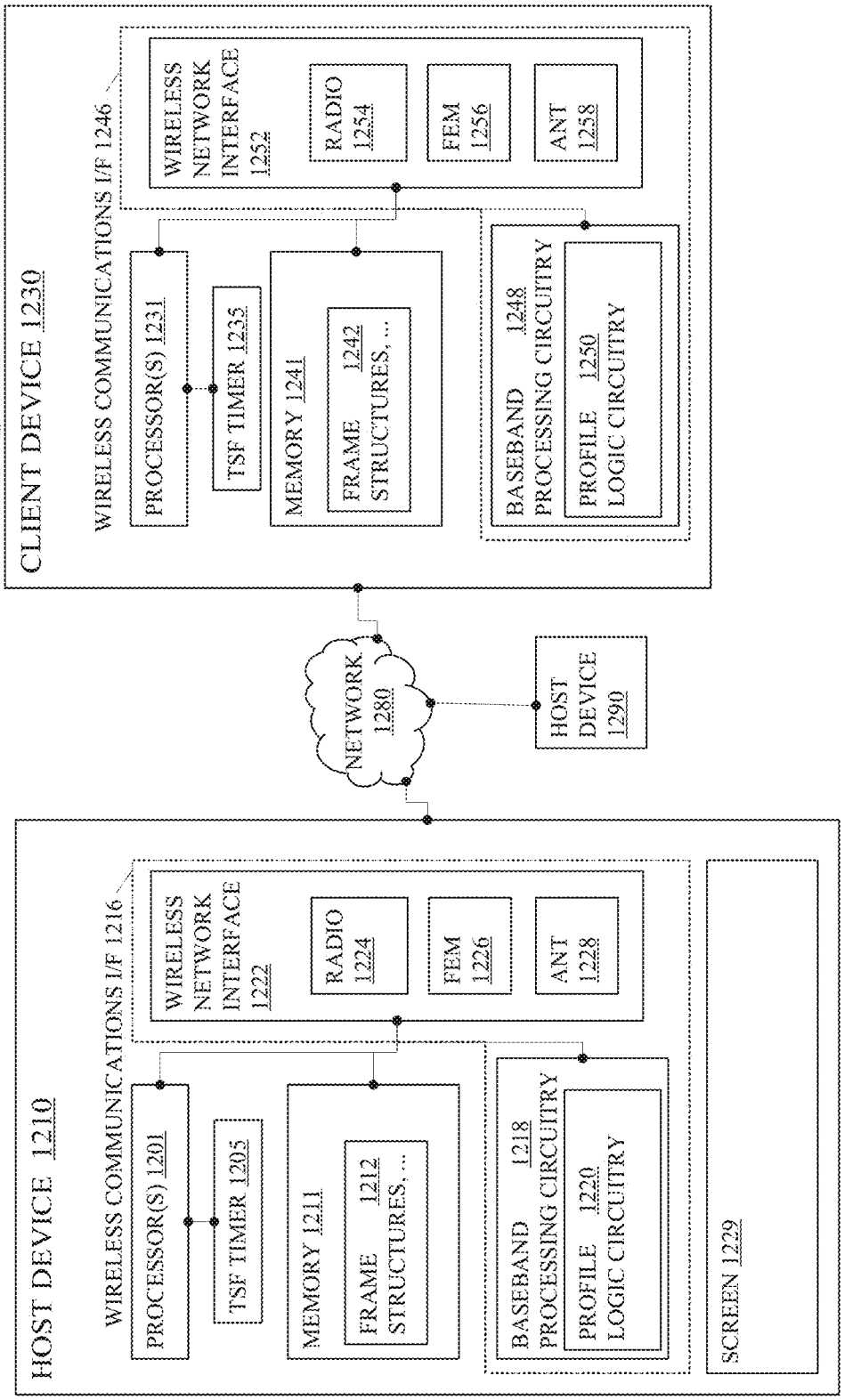
FIG. 1B depicts an embodiment of a system including multiple devices to implement profile logic circuitry, in accordance with one or more example embodiments.

FIG. 1B depicts an embodiment of a system 1200 including multiple BT devices to implement profile logic circuitry, in accordance with one or more example embodiments. System 1200 may transmit or receive as well as generate, decode, and interpret transmissions between host devices 1210 and 1290 and a client device 1230. The host devices 1210 and 1290 may wirelessly connect to the client device 1230.

In some embodiments, the host devices 1210 and 1290 and client device 1230 may include one or more computer systems similar to that of the example machines/systems of FIGS. 5, 6, 7, and 8.

The client device 1230 may include profile logic circuitry, such as the profile logic circuitry 1220 of host device 1210, to associate with the host device 1210 via TxOPs on a Bluetooth (e.g., 2.4 GHz) channel.

While connecting with the host device 1210, the host device 1210 may transmit BT profile to the client device 1230. The client device 1230 may receive the BT profile and send a BT profile to the host device 1210. In many embodiments, the BT profile may include a visual interface profile. The visual interface profile may establish a visual interface in a Bluetooth host UI of the host device 1210 to interact with a user to extend functionality of the client device 1230. For instance, the Bluetooth host UI may include a Bluetooth settings UI for settings and a Bluetooth connection UI to select a connection with a different host device that is already paired with the client device such as the host device 1290. The Bluetooth settings UI may display on a screen 1229 of the host device 1210, a visual representation provided by the client device 1230 via a visual interface profile, of the various modifiable settings for the client device 1230. In some embodiments, the visual interface profile and the visual representation may display current settings and/or default settings.

The Bluetooth connection UI may display on a screen 1229 of the host device 1210, a visual representation provided by the client device 1230 via a visual interface profile, of a set of host devices with which the client device 1230 is already paired. In some embodiments, the visual interface profile and the visual representation may display host devices that are currently available also.

The user may adjust the settings and cause the host device 1210 to store the new settings in the client device 1230 and the user may enter the Bluetooth connection UI to select a different host device such as the host device 1290. In response to receipt of the new or updated settings, the host device 1210 may transmit a BT frame to the client device to instruct the client device 1230 to store the new or updated settings. In some embodiments, the same BT frame may comprise an instruction from the user for the client device 1230 to connect to the host device 1290.

In several embodiments, the client device 1230 may store the new or updated settings in memory and may, in response to the instruction to connect with the host device 1290, terminate the connection with the host device 1210 and initiate a connection with the host device 1290. In other embodiments, the client device 1230 may be capable of connecting with the host device 1230 while remaining connected to the host device 1210. In such embodiments, the visual interface profile may include one or more additional selections such as a selection to terminate the connection with the current host device 1210 and connect with the host device 1290 and/or a selection to terminate the connection with the current host device 1290.

The host device 1210 and client device 1230 may comprise processor(s) 1201 and memory 1231, respectively. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC (or link) frames and/or PHY frames and PDUs.

The baseband processing circuitry 1218 may comprise a baseband processor and/or one or more circuits to implement a station management entity. In some embodiments, the station management entity may interact with a MAC (or link) layer management entity to perform MAC layer functionality and a PHY management entity to perform PHY functionality. In such embodiments, the baseband processing circuitry 1218 may interact with processor(s) 1201 to coordinate higher layer functionality with MAC layer and PHY functionality.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211. In further embodiments, the MAC layer functionality may interface the processor(s) 1201.

The MAC layer functionality may communicate with the PHY to transmit a MAC frame such as a BT frame, in a PHY frame to the client device 1230. The MAC layer functionality may generate frames such as management, data, and control frames.

The PHY may prepare the MAC frame for transmission by, e.g., determining a preamble to prepend to a MAC frame to create a PHY frame. A wireless network interface 1222 or the baseband processing circuitry 1218 may prepare the PHY frame as a scrambled, encoded, modulated PDU in the time domain signals for the radio 1224. Furthermore, the TSF timer 1205 may provide a timestamp value to indicate the time at which the PDU is transmitted.

After processing the PHY frame, a radio 1224 may impress digital data onto subcarriers of RF frequencies for transmission. The front end module 1226 may include one or more stages of filters and one or more stages of amplification including at least one power amplifier (PA) for digital data on subcarriers of RF frequencies for transmission by electromagnetic radiation via elements of an antenna array or antennas 1224 and via the network 1280 to a receiving device such as the client device 1230.

The wireless network I/F 1222 also comprises a receiver. The receiver receives electromagnetic energy, extracts the digital data, and the analog PHY and/or the baseband processor 1218 decodes a PHY frame and a MAC frame from a PDU.

The client device 1230 may receive the BT frame from the host device 1210 via the network 1280. The client device 1230 may comprise processor(s) 1231 and memory 1241. The processor(s) 1231 may comprise any data processing device such as a microprocessor, a microcontroller, a state machine, and/or the like, and may execute instructions or code in the memory 1241. The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames (PDUs).

The baseband processing circuitry 1248 may comprise a baseband processor and/or one or more circuits to implement a station management entity and the station management entity may interact with a MAC layer management entity to perform MAC layer functionality and a PHY management entity to perform PHY functionality. In such embodiments, the baseband processing circuitry 1248 may interact with processor(s) 1231 to coordinate higher level functionality, such as an application level functionality, with MAC layer and PHY functionality.

In some embodiments, the baseband processing circuitry 1218 may interact with one or more analog devices to perform PHY functionality such as descrambling, decoding, demodulating, and the like. In other embodiments, the baseband processing circuitry 1218 may execute code to perform one or more of the PHY functionalities such as descrambling, decoding, demodulating, and the like.

The client device 1230 may receive the BT frame at the antennas 1258, which pass the signals along to the FEM 1256. The FEM 1256 may amplify and filter the signals and pass the signals to the radio 1254. The radio 1254 may filter the carrier signals from the signals and determine if the signals represent a PDU. If so, analog circuitry of the wireless network I/F 1252 or physical layer functionality implemented in the baseband processing circuitry 1248 may demodulate, decode, descramble, etc. the PDU. The baseband processing circuitry 1248 may identify, parse, and interpret the BT frame from PDU.

Figure 1C:
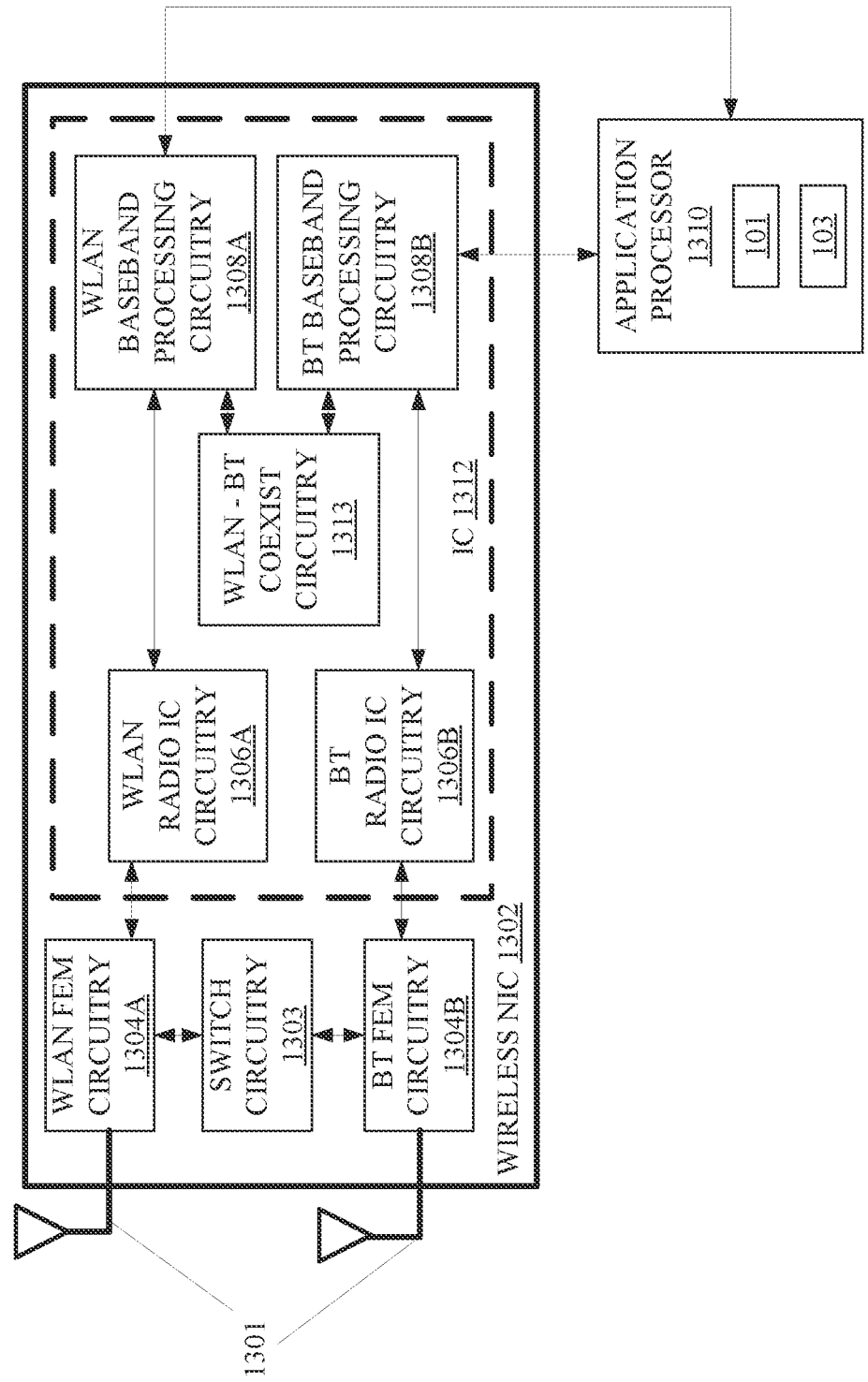
FIG. 1C illustrates an embodiment of a radio architecture for STAs, such as the wireless interfaces for STAs depicted in FIGS. 1A-B, to implement profile logic circuitry.

FIG. 1C is a block diagram of a radio architecture 1300 such as the wireless communications I/F 1222 and 1252 in accordance with some embodiments that may be implemented in, e.g., the host device 1210 and/or the client device 1230 of FIG. 1C. The radio architecture 1300 may include radio front-end module (FEM) circuitry 1304a-b, radio IC circuitry 1306a-b and baseband processing circuitry 1308a-b. The radio architecture 1300 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304a-b may include a WLAN or Wi-Fi FEM circuitry 1304a and a Bluetooth (BT) FEM circuitry 1304b. The WLAN FEM circuitry 1304a may include a receive signal path comprising circuitry configured to operate on WLAN RF signals received from one or more antennas 1301, to amplify the received signals and to provide the amplified versions of the received signals to the WLAN radio IC circuitry 1306a for further processing. The BT FEM circuitry 1304b may include a receive signal path which may include circuitry configured to operate on BT RF signals received from one or more antennas 1301, to amplify the received signals and to provide the amplified versions of the received signals to the BT radio IC circuitry 1306b for further processing. FEM circuitry 1304a may also include a transmit signal path which may include circuitry configured to amplify WLAN signals provided by the radio IC circuitry 1306a for wireless transmission by one or more of the antennas 1301. In addition, FEM circuitry 1304b may also include a transmit signal path which may include circuitry configured to amplify BT signals provided by the radio IC circuitry 1306b for wireless transmission by the one or more antennas. In the embodiment of FIG. 1C, although FEM 1304a and FEM 1304b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306a-b as shown may include WLAN radio IC circuitry 1306a and BT radio IC circuitry 1306b. The WLAN radio IC circuitry 1306a may include a receive signal path which may include circuitry to down-convert WLAN RF signals received from the FEM circuitry 1304a and provide baseband signals to WLAN baseband processing circuitry 1308a. BT radio IC circuitry 1306b may in turn include a receive signal path which may include circuitry to down-convert BT RF signals received from the FEM circuitry 1304b and provide baseband signals to BT baseband processing circuitry 1308b. WLAN radio IC circuitry 1306a may also include a transmit signal path which may include circuitry to up-convert WLAN baseband signals provided by the WLAN baseband processing circuitry 1308a and provide WLAN RF output signals to the FEM circuitry 1304a for subsequent wireless transmission by the one or more antennas 1301. BT radio IC circuitry 1306b may also include a transmit signal path which may include circuitry to up-convert BT baseband signals provided by the BT baseband processing circuitry 1308b and provide BT RF output signals to the FEM circuitry 1304b for subsequent wireless transmission by the one or more antennas 1301. In the embodiment of FIG. 1D, although radio IC circuitries 1306a and 1306b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1308a-b may include a WLAN baseband processing circuitry 1308a and a BT baseband processing circuitry 1308b. The WLAN baseband processing circuitry 1308a may include a memory, such as, for example, a set of RAM arrays in a Fast Fourier Transform or Inverse Fast Fourier Transform block (not shown) of the WLAN baseband processing circuitry 1308a. Each of the WLAN baseband circuitry 1308a and the BT baseband circuitry 1308b may further include one or more processors and control logic to process the signals received from the corresponding WLAN or BT receive signal path of the radio IC circuitry 1306a-b, and to also generate corresponding WLAN or BT baseband signals for the transmit signal path of the radio IC circuitry 1306a-b. Each of the baseband processing circuitries 1308a and 1308b may further include physical layer (PHY) and medium access control layer (MAC) circuitry (or link layer circuitry), and may further interface with a device for generation and processing of the baseband signals and for controlling operations of the radio IC circuitry 1306a-b.

Referring still to FIG. 1C, according to the shown embodiment, WLAN-BT coexistence circuitry 1313 may include logic providing an interface between the WLAN baseband circuitry 1308a and the BT baseband circuitry 1308b to enable use cases requiring WLAN and BT coexistence. In addition, a switch circuitry 1303 may be provided between the WLAN FEM circuitry 1304a and the BT FEM circuitry 1304b to allow switching between the WLAN and BT radios according to application needs. In addition, although the antennas 1301 are depicted as being respectively connected to the WLAN FEM circuitry 1304a and the BT FEM circuitry 1304b, embodiments include within their scope the sharing of one or more antennas as between the WLAN and BT FEMs, or the provision of more than one antenna connected to each of FEM 1304a or 1304b.

In some embodiments, the front-end module circuitry 1304a-b, the radio IC circuitry 1306a-b, and baseband processing circuitry 1308a-b may be provided on a single radio card, such as wireless network interface card (NIC) 1302. In some other embodiments, the one or more antennas 1301, the FEM circuitry 1304a-b and the radio IC circuitry 1306a-b may be provided on a single radio card. In some other embodiments, the radio IC circuitry 1306a-b and the baseband processing circuitry 1308a-b may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1300 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1300 may be part of a Wi-Fi communication station (STA) such as a wireless access point (AP), a base station or a mobile device including a Wi-Fi device. In some of these embodiments, radio architecture 1300 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, and/or 802.11be standards and/or proposed specifications for WLANs, although the scope of embodiments is not limited in this respect. The radio architecture 1300 may also be suitable to transmit and/or receive communications in accordance with other techniques and standards.

In some embodiments, the radio architecture 1300 may be configured for high-efficiency Wi-Fi (HEW) communications in accordance with the IEEE 802.11ax standard. In these embodiments, the radio architecture 1300 may be configured to communicate in accordance with an OFDMA technique, although the scope of the embodiments is not limited in this respect.

In some other embodiments, the radio architecture 1300 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1D, the BT baseband circuitry 1308*b* may be compliant with a Bluetooth (BT) connectivity specification such as Bluetooth 5.0, or any other iteration of the Bluetooth specification.

In some embodiments, the radio architecture 1300 may include other radio cards, such as a cellular radio card configured for cellular (e.g., 5GPP such as LTE, LTE-Advanced or 7G communications).

In some IEEE 802.11 embodiments, the radio architecture 1300 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies, however.

FIG. 1D illustrates front end module (FEM) circuitry 1400 such as WLAN FEM circuitry 1304*a* and/or the BT FEM circuitry 1304*b* shown in FIG. 1C in accordance with some embodiments. Although the example of FIG. 1E is described in conjunction with the WLAN FEM circuitry 1304*a*, the example of FIG. 1E may be described in conjunction with other configurations such as the BT FEM circuitry 1304*b*.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1400 may include a low-noise amplifier (LNA) 1406 to amplify received RF signals 1403 and provide the amplified received RF signals 1407 as an output (e.g., to the radio IC circuitry 1306*a-b* (FIG. 1D)). The transmit signal path of the circuitry 1304*a* may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 1D)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 6 GHz frequency spectrum. In these embodiments, the receive signal path of the FEM circuitry 1400 may include a receive signal path duplexer 1404 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1D). In some embodiments, BT communications may utilize the 2.4 GHz signal paths and may utilize the same FEM circuitry 1400 as the one used for WLAN communications.

FIG. 1E illustrates radio integrated circuit (IC) circuitry 1506*a* in accordance with some embodiments. The radio IC circuitry 1306*a* is one example of circuitry that may be suitable for use as the WLAN or BT radio IC circuitry 1306*a*/1306*b* (FIG. 1D), although other circuitry configurations may also be suitable. Alternatively, the example of FIG. 1F may be described in conjunction with the example BT radio IC circuitry 1306*b*.

Figure 1F:
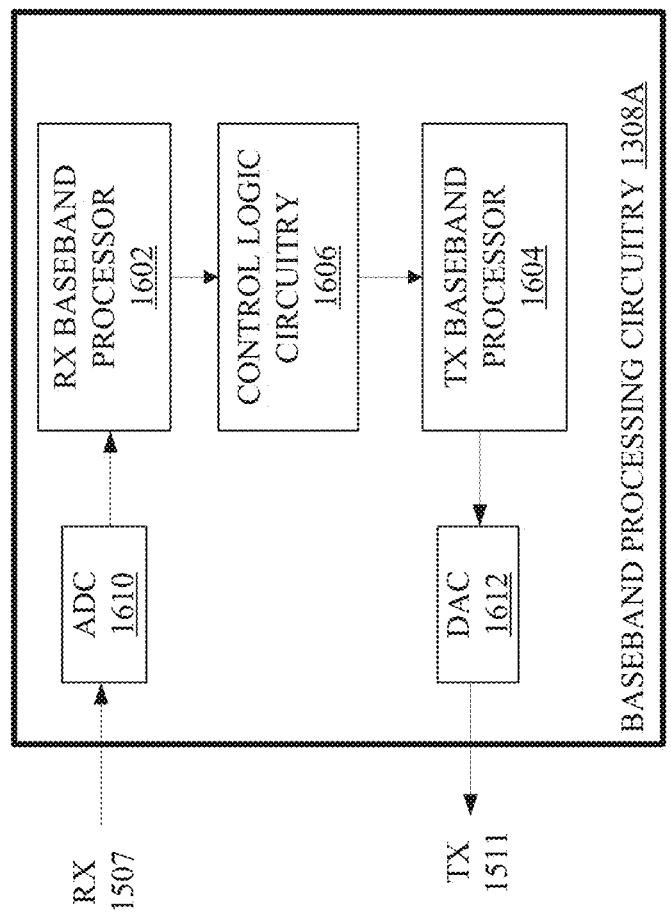
FIG. 1F illustrates an embodiment of baseband processing circuitry of a wireless interface for devices, such as the devices in FIGS. 1A-B, to implement profile logic circuitry.

In some embodiments, the radio IC circuitry 1306*a* may include a receive signal path and a transmit signal path. The receive signal path of the radio IC circuitry 1306*a* may include at least mixer circuitry 1502, such as, for example, down-conversion mixer circuitry, amplifier circuitry 1506 and filter circuitry 1508. The transmit signal path of the radio IC circuitry 1306*a* may include at least filter circuitry 1512 and mixer circuitry 1514, such as, for example, upconversion mixer circuitry. Radio IC circuitry 1306*a* may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1F illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304*a-b* (FIG. 1D) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308*a-b* (FIG. 1D) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304*a-b*. The baseband signals 1511 may be provided by the baseband processing circuitry 1308*a-b* and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or upconversion respectively with the help of synthesizer 1504.

In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct upconversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1F may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1F). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1E) may comprise a balanced signal, although the scope of the embodiments is not limited in this respect. The I and Q baseband output signals may be provided to low-noise amplifier, such as amplifier circuitry 1506 (FIG. 1F) or to filter circuitry 1508 (FIG. 1F).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1504 may be provided by a voltage controlled oscillator (VCO), although that is not a requirement. A divider control input may further be provided by either of the baseband processing circuitry 1308*a-b* (FIG. 1D) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

FIG. 1F illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1D), although other circuitry configurations may also be suitable. Alternatively, the example of FIG. 1F may be used to implement the example BT baseband processing circuitry 1308*b* of FIG. 1D.

The baseband processing circuitry 1308*a* may include a receive baseband processor (RX BBP) 1602 for processing receive baseband signals 1509 provided by the radio integrated circuit (IC) circuitry 1306*a-b* (FIG. 1D) and a transmit baseband processor (TX BBP) 1604 for generating transmit baseband signals 1511 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include digital-to-analog converter (DAC) 1612 to convert digital baseband signals from the TX BBP 1604 to analog baseband signals 1611.

In some embodiments that communicate orthogonal frequency multiplexing (OFDM) signals or orthogonal frequency multiple access (OFDMA) signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1C, in some embodiments, the antennas 1301 (FIG. 1C) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Figure 2:
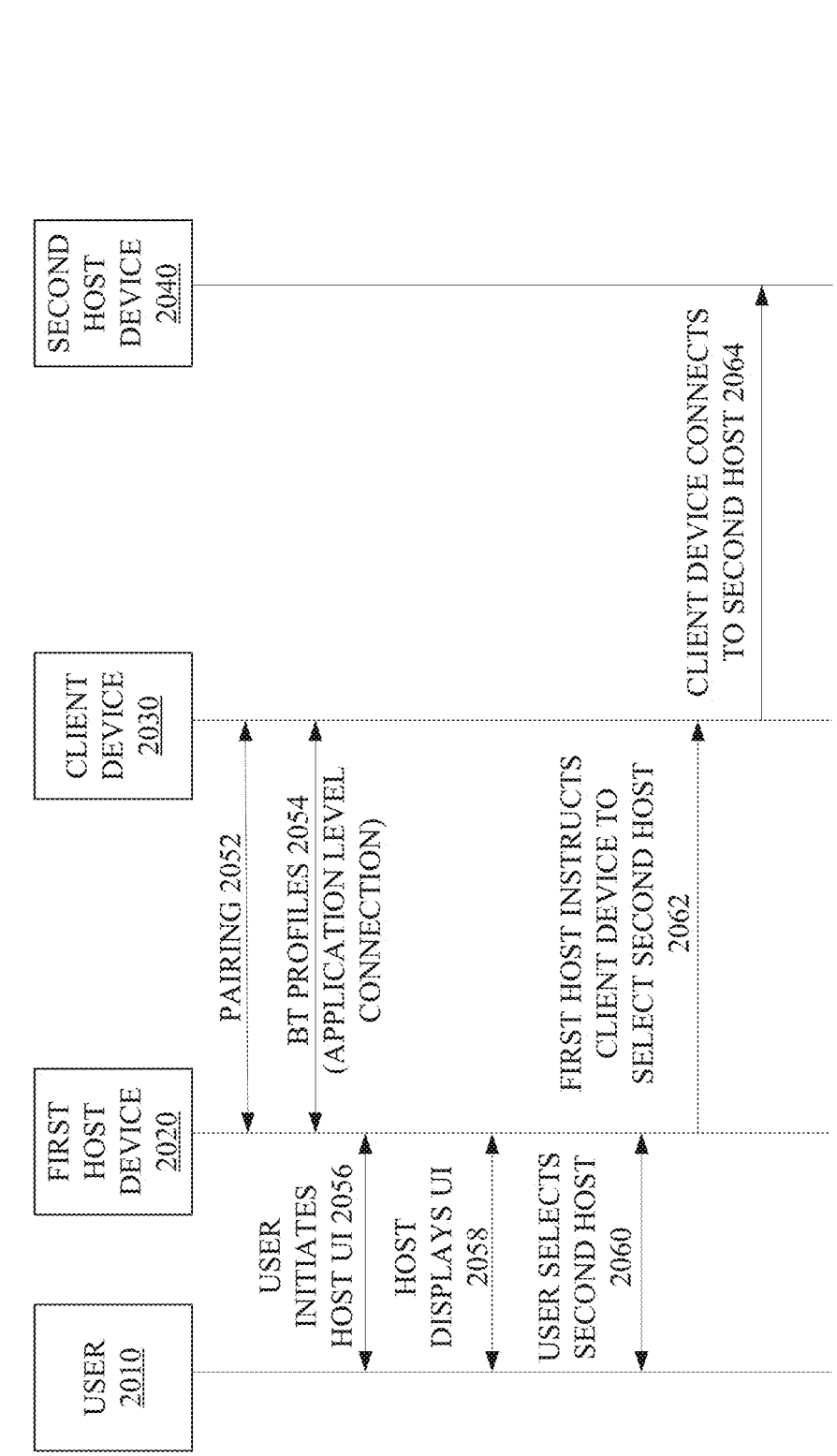
FIG. 2 depicts an embodiment of an interaction diagram to implement profile logic circuitry.

FIG. 2 depicts another embodiment of an interaction diagram 2000 to implement profile logic circuitry such as the profile logic circuitry described in conjunction with FIGS. 1-8. The interaction diagram 2000 illustrates interactions of a user 2010, a first host device 2020, a client device 2030, and a second host device 2040. The interaction diagram 2000 may not show every detailed step performed but may show the steps generally.

The profile logic circuitry of the host device (such as the host device 1210 shown in FIG. 1B) and the client device may initiate a pairing 2052 operation. The pairing operation may relate to security and may only occur the first time the first host device 2020 and the client device 2030 establish a link. The first host device 2020 may generally establish a secret key during pairing, a physical layer link, a link layer link, and application level connections with the client device to initially establish a connection between the first host device 2020 and the client device 2030.

After the first host device 2020 is paired with the client device 2030, the first host device 2020 may form an application level connections through the exchange of application services and connection information including the BT profiles 2054. The BT profiles 2054 may each include a visual interface profile. The visual interface profile provided by the host device 2020 may include information such as a screen size as well as information about sending and receiving data. The visual interface profile provided by the client device 2030 may include information such as default and available settings for preferences of the client device 2030, descriptions and options related to user controls that are available for customization such as frequency band adjustments, default volume, default connections, current selections, available selections for each control, list of devices currently paired with the client device 2030, and/or the like.

After making an application level connection between the first host device 2020 and the client device 2030, the user may interact with the first host device 2020 to initiate a Bluetooth host UI 2056. The Bluetooth host UI may include a Bluetooth settings UI for settings and a Bluetooth connection UI to select a connection with a different host device. The host device 2020 may display the Bluetooth host UI on a display connected to or integrated with the host device 2020. In some embodiments, the Bluetooth host UI may include text or activatable text that the user may select graphically with, e.g., with a pointer and a selection such as a click of a mouse button.

After displaying the Bluetooth host UI, the user may select the Bluetooth connection UI to select a connection with a different host device and then select the second host device 1040 from a list of host devices currently paired with the client device 2030. In some embodiments, the first host device 2020 may also include available host devices.

After the user selects the second host device 2060, the first host device 2020 may transmit a BT frame to the client device 2030 to instruct or inform the client device 2030 of the user's selection 2062. Thereafter, the client device 2030 may terminate the active connection with the first host device 2020 and initiate a connection with the second host device 2040.

FIG. 3 depicts an embodiment of a flowchart 3000 to implement profile logic circuitry such as the profile logic circuitry discussed in FIGS. 1-3. Once two devices are paired, there is trust between the devices. If the devices are presently connected and user wishes to change the settings of a client device, the user can access these through the Bluetooth Settings user interface (UI) provided by the host device.

At element 3010, profile logic circuitry of a host device (e.g., the profile logic circuitry 1220 of the host device 1210 or the profile logic circuitry 1250 of client device 1230 shown FIG. 1B) may initiate a Bluetooth settings UI in response to user input. At element 3015, the host device may display a list of connected devices. The list of connected devices may include currently connected devices and, in some embodiments, the Bluetooth Settings UI, may list unconnected but paired BT devices such as a client device like client device 1230 shown FIG. 1B.

Once the host device initiates the Bluetooth settings UI, the user may select a client device at element 3020 and display the settings of the client device at element 3025. The settings may include settings for programmable features and the user may modify the settings via the Bluetooth settings UI. For instance, the client device may comprise a BT headset and the programmable settings may include a combination of buttons that performs a function. In some embodiments, the user may change the combination of buttons to perform the function. In some embodiments, the settings may also include, for example, graphic equalizer for frequency band adjustments.

The user may change the settings via the Bluetooth settings UI of the host device at element 3025 and the host device may communicate the changes to the settings to the client device via a BT frame.

FIG. 4 depicts an embodiment of a flowchart 4000 to implement profile logic circuitry such as the profile logic circuitry discussed in FIGS. 1-3. At element 4010, profile logic circuitry of the host device (e.g., the profile logic circuitry 1220 of the host device 1210 or the profile logic circuitry 1250 of client 1230 shown FIG. 1B) may connect, by the client device with a host device, via a Bluetooth (BT) channel. Once the host device has paired and established a logic link with the client device, the host device may maintain the initial setup information in memory. Connection involves the exchange of service and connection information such as the BT profiles of the host device and the client device.

At element 4015, the client device may transmit a BT profile to complete the application layer connection with the host device. The BT profile may comprise a visual profile. The visual profile may describe an application layer feature to visually present a set of BT devices currently paired with the client device. In some embodiments, the visual profile may further include profile information will have details of the user controls that are available, current selections, available selections for each control, and the like. For instance, visual profile transmitted by the client device may further describe an application layer feature to visually present a programmable feature of the client device and one or more optional settings for the programmable feature. If the user of the host device decides to change settings of the programmable feature, the user may input the changes and the host device may transmit the changes in the BT frame or a different frame. The client device may store the new or updated settings for the programmable feature in a non-volatile memory such as a flash memory.

The host device may also provide, and the client device may receive of a host BT profile from the host device that includes, e.g., information such as screen size and any other information that will let the client device determine how to best to send and receive data. It is understood that the above descriptions are for purposes of illustration and are not meant to be limiting.

At element 4020, after the client device is connected with the host device, the client device may receive a BT frame, in accordance with the BT profile, from the host device. The BT frame may instruct the client device to connect to the second BT host based on a user input via the host device's user interface.

In response to the instruction to connect to the second host device, the client device may, in some embodiments, terminate the connection with the host device and initiate a connection with the second host device (element 4025). In many embodiments, the client device may establish a link with the second host device in response to receipt of the BT frame and establish the connection with the second host after establishing the link.

Figure 5:
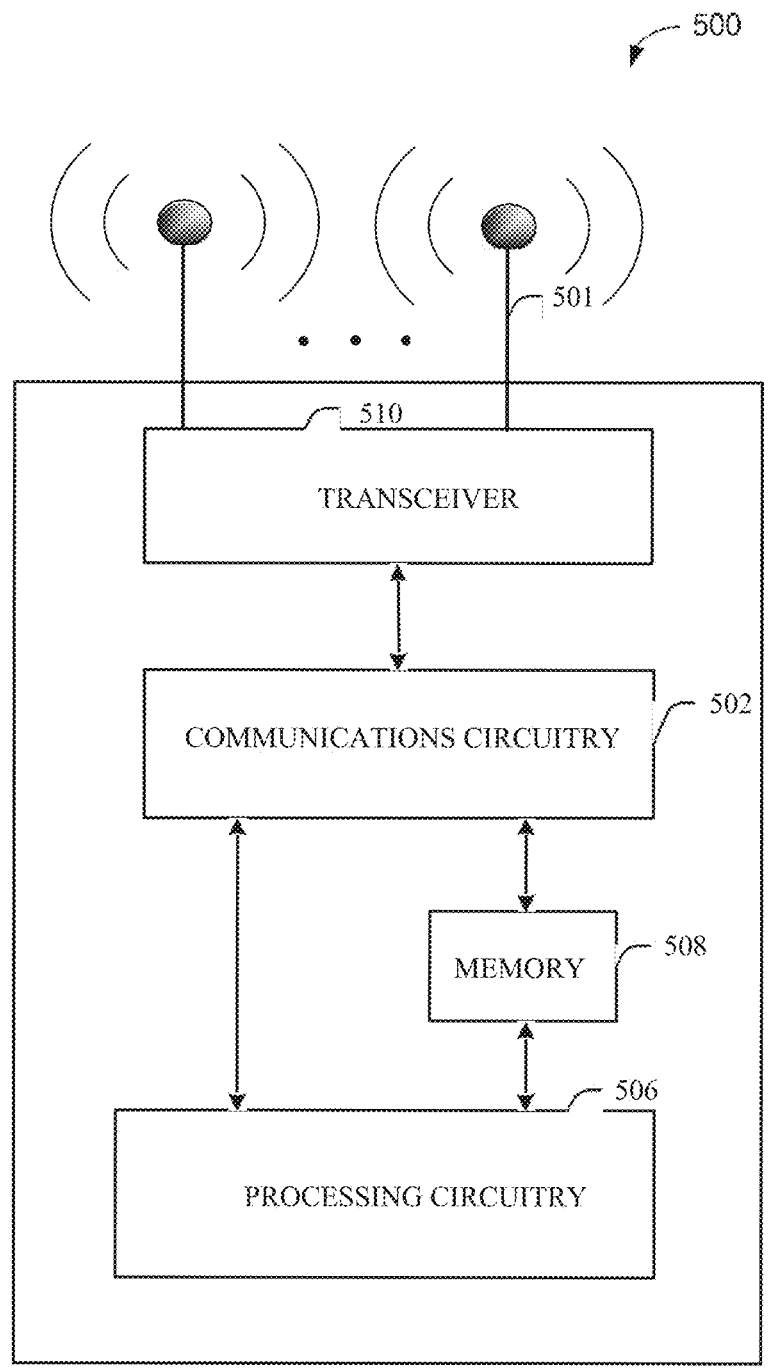
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a host device or client device that may be suitable for use as an AP 1005 (FIG. 1A) or one of the user device, tablet 1029 (FIG. 1A) in accordance with some embodiments. The communication station 500 may also be suitable for use as other user device(s) 1020 such as the user devices 1024, 1025, 1026, 1027, and/or 1028. The user devices 1024, 1025, 1026, 1027, 1028, and/or 1029 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or link layer communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
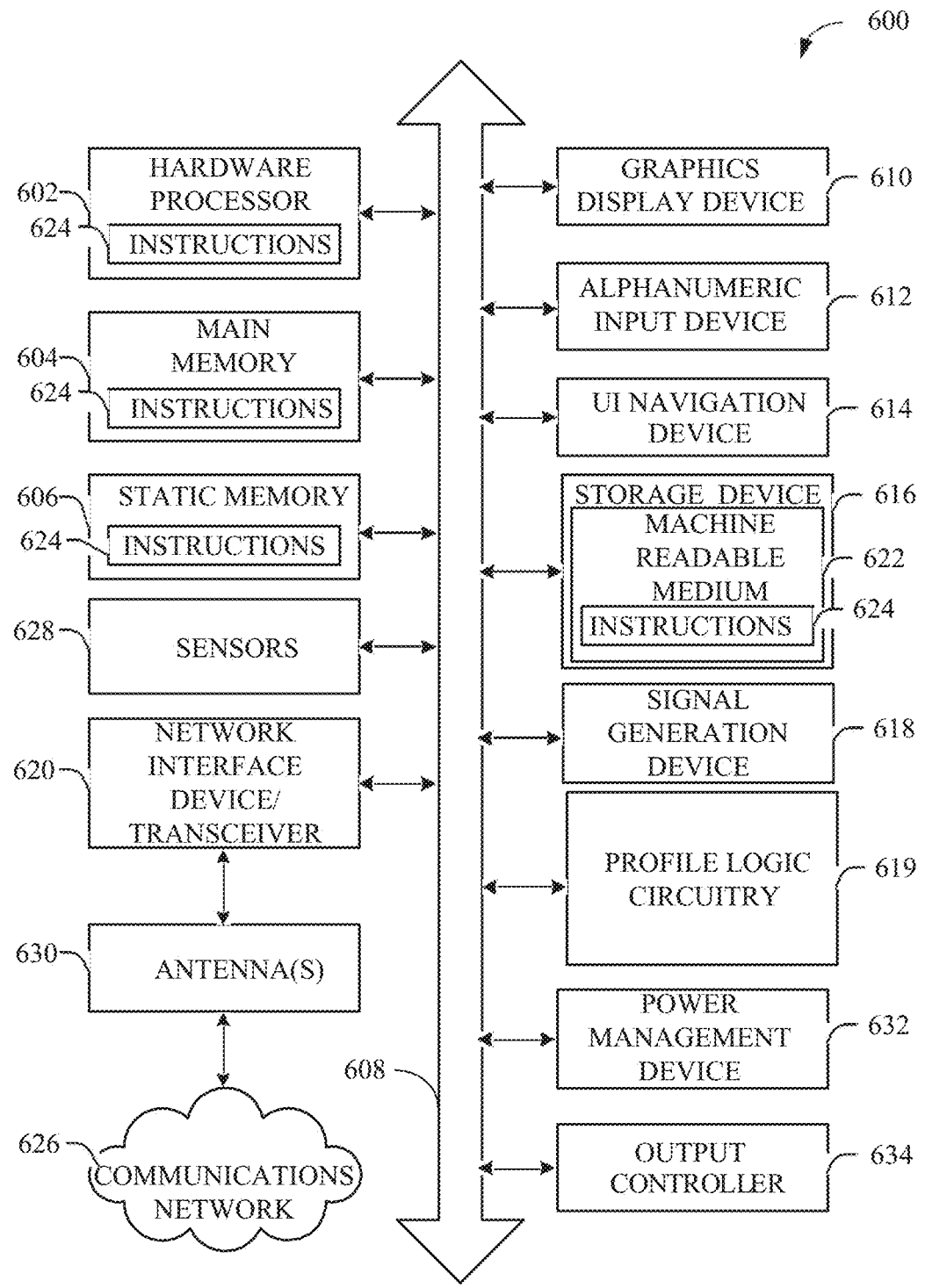
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP such as the AP 1005 and/or one of the user devices 1020 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices, and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a profile logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the profile logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The profile logic circuitry 619 may carry out or perform any of the operations and processes in relation to connection between a host device and a client device to facilitate selection of a second host with which to connect and selection of settings or the like (e.g., flowchart 3000 shown in FIG. 3, and flowchart 4000 shown in FIG. 4) described and shown above. It is understood that the above are only a subset of what the profile logic circuitry 619 may be configured to perform and that other functions included throughout this disclosure may also be performed by the profile logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
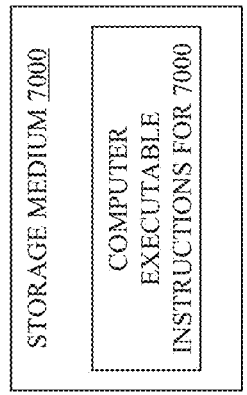
FIGS. 7-8 depict embodiments of a computer-readable storage medium and a computing platform to implement profile logic circuitry.

FIG. 7 illustrates an example of a storage medium 7000 to store assessment logic such as logic to implement the profile logic circuitry 619 shown in FIG. 6 and/or the other logic discussed herein perform visual profile connection. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
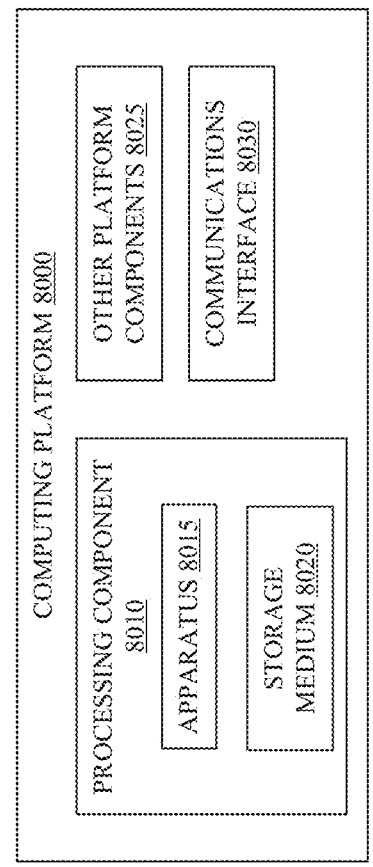

FIG. 8 illustrates an example computing platform 8000 such as the host device 1210 and client device 1230 in FIG. 1B. In some examples, as shown in FIG. 8, computing platform 8000 may include a processing component 8010, other platform components or a communications interface 8030 such as the wireless network interfaces 1222 and 1252 shown in FIG. 1A. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of profile logic circuitry, advantageously allows users can have better control on the devices. Use of profile logic circuitry advantageously provides easier operation for users to choose the BT device with which to be connected. Use of profile logic circuitry advantageously provides easier operation for users to choose the BT device without a need turn off/on any of BT devices to get desired connection outcome. Use of profile logic circuitry advantageously offers users the capability to adjust settings of a BT device through a host user interface (UI) operations. Use of profile logic circuitry advantageously offers users the capability to adjust settings of a BT device through a host user interface (UI) opens possibilities of adding more finer controls to a device without needing to add complex hardware-based controls of adding more finer controls.

Examples of Further Embodiments

The following examples pertain to further embodiments. Specifics in the examples may be used anywhere in one or more embodiments.

Example 1 is an apparatus comprising: a memory; and logic circuitry of a host device coupled with the memory to: connect, by the host device with a client device, via a Bluetooth (BT) channel; receive a BT profile, the BT profile comprising a visual profile, the visual profile to describe an application layer feature to visually present a set of BT devices paired with the client device; present, via a display of the host device, a visual representation of the set of devices paired with the client device; receive user input associated with the visual representation of the set of devices paired with the client device, the user input indicating selection of a second host device; and cause transmission of a BT frame, in accordance with the BT profile, to the client device to cause the client device to connect to the second BT host. Example 2 is the apparatus of Example 1, wherein the logic circuitry comprises baseband processing circuitry and further comprising a radio coupled with the baseband processing circuitry, and one or more antennas coupled with the radio to transmit the BT frame. Example 3 is the apparatus of Example 1, the visual profile to further describe an application layer feature to visually present a programmable feature of the client device and one or more optional settings for the programmable feature. Example 4 is the apparatus of Example 3, wherein the user input comprises a selection of at least one of the one or more of the optional settings. Example 5 is the apparatus of Example 1, the logic circuitry to further present an edit feature, the edit feature, after activation, to change the visual representation of the set of devices paired with the client device. Example 6 is the apparatus of Example 5, wherein the edit feature, after activation, receives user input to change a description of a paired device in the set of BT devices paired with the client device. Example 7 is the apparatus of Example 1, the logic circuitry to further cause transmission of a host BT profile. Example 8 is the apparatus of Example 1, the visual profile to visually present the set of BT devices paired with the client device by presenting a list of activatable text description, selection of one of the activatable text items to indicate user selection of a first BT device of the set of BT devices.

Example 9 is a non-transitory computer-readable medium, comprising instructions, which when executed by a processor, cause the processor to perform operations to: connect, by a host device with a client device, via a Bluetooth (BT) channel; receive a BT profile, the BT profile comprising a visual profile, the visual profile to describe an application layer feature to visually present a set of BT devices paired with the client device; present, via a display of the host device, a visual representation of the set of devices paired with the client device; receive user input associated with the visual representation of the set of devices paired with the client device, the user input indicating selection of a second host device; and cause transmission of a BT frame, in accordance with the BT profile, to the client device to cause the client device to connect to the second BT host. Example 10 is the non-transitory computer-readable medium of Example 9, the visual profile to further describe an application layer feature to visually present a programmable feature of the client device and one or more optional settings for the programmable feature. Example 11 is the non-transitory computer-readable medium of Example 10, wherein the user input comprises a selection of at least one of the one or more of the optional settings. Example 12 is the non-transitory computer-readable medium of Example 9, the operations to further present an edit feature, the edit feature, after activation, to change the visual representation of the set of devices paired with the client device. Example 13 is the non-transitory computer-readable medium of Example 12, wherein the edit feature, after activation, receives user input to change a description of a paired device in the set of BT devices paired with the client device. Example 14 is the non-transitory computer-readable medium of Example 9, wherein further comprising causing transmission of a host BT profile. Example 15 is the non-transitory computer-readable medium of Example 9, the visual profile to visually present the set of BT devices paired with the client device by presenting a list of activatable text description, selection of one of the activatable text items to indicate user selection of a first BT device of the set of BT devices.

Example 16 is a method comprising: connecting, by a host device with a client device, via a Bluetooth (BT) channel; receiving a BT profile, the BT profile comprising a visual profile, the visual profile to describe an application layer feature to visually present a set of BT devices paired with the client device; presenting, via a display of the host device, a visual representation of the set of devices paired with the client device; receiving user input associated with the visual representation of the set of devices paired with the client device, the user input indicating selection of a second host device; and causing transmission of a BT frame, in accordance with the BT profile, to the client device to cause the client device to connect to the second BT host. Example 17 is the method of Example 16, the visual profile to further describe an application layer feature to visually present a programmable feature of the client device and one or more optional settings for the programmable feature. Example 18 is the method of Example 17, wherein the user input comprises a selection of at least one of the one or more of the optional settings. Example 19 is the method of Example 16, the operations to further present an edit feature, the edit feature, after activation, to change the visual representation of the set of devices paired with the client device. Example 20 is the method of Example 19, wherein the edit feature, after activation, receives user input to change a description of a paired device in the set of BT devices paired with the client device. Example 21 is the method of Example 16, wherein further comprising causing transmission of a host BT profile. Example 22 is the method of Example 16, the visual profile to visually present the set of BT devices paired with the client device by presenting a list of activatable text description, selection of one of the activatable text items to indicate user selection of a first BT device of the set of BT devices.

Example 23 is an apparatus comprising: a means for connecting, by a host device with a client device, via a Bluetooth (BT) channel; a means for receiving a BT profile, the BT profile comprising a visual profile, the visual profile to describe an application layer feature to visually present a set of BT devices paired with the client device; a means for presenting, via a display of the host device, a visual representation of the set of devices paired with the client device; a means for receiving user input associated with the visual representation of the set of devices paired with the client device, the user input indicating selection of a second host device; and a means for causing transmission of a BT frame, in accordance with the BT profile, to the client device to cause the client device to connect to the second BT host. Example 24 is the apparatus of Example 23, the visual profile to further describe an application layer feature to visually present a programmable feature of the client device and one or more optional settings for the programmable feature. Example 25 is the apparatus of Example 24, wherein the user input comprises a selection of at least one of the one or more of the optional settings. Example 26 is the apparatus of Example 23, the operations to further present an edit feature, the edit feature, after activation, to change the visual representation of the set of devices paired with the client device. Example 27 is the apparatus of Example 26, wherein the edit feature, after activation, receives user input to change a description of a paired device in the set of BT devices paired with the client device. Example 28 is the apparatus of Example 23, wherein further comprising causing transmission of a host BT profile. Example 29 is the apparatus of Example 23, the visual profile to visually present the set of BT devices paired with the client device by presenting a list of activatable text description, selection of one of the activatable text items to indicate user selection of a first BT device of the set of BT devices.

Example 30 is an apparatus comprising: a memory; and logic circuitry of a client coupled with the memory to: connect, by the client device with a host device, via a Bluetooth (BT) channel; transmit a BT profile, the BT profile comprising a visual profile, the visual profile to describe an application layer feature to visually present a set of BT devices paired with the client device; receive a BT frame, in accordance with the BT profile, from the host device, the BT frame to instruct the client device to connect to the second BT host; and connect to a second BT host in response to receipt of the BT frame. Example 31 is the apparatus of Example 30, wherein the logic circuitry comprises baseband processing circuitry and further comprising a radio coupled with the baseband processing circuitry, and one or more antennas coupled with the radio to receive the BT frame. Example 32 is the apparatus of Example 30, the logic circuitry to further establish a link with the second host device in response to receipt of the BT frame. Example 33 is the apparatus of Example 30, the visual profile to further describe an application layer feature to visually present a programmable feature of the client device and one or more optional settings for the programmable feature. Example 34 is the apparatus of Example 30, the logic circuitry to further receive of a host BT profile. Example 35 is the apparatus of Example 30, the visual profile to include a list of text descriptions representative of the set of BT devices.

Example 36 is a non-transitory computer-readable medium, comprising instructions, which when executed by a processor, cause the processor to perform operations to: connect, by a client device with a host device, via a Bluetooth (BT) channel; transmit a BT profile, the BT profile comprising a visual profile, the visual profile to describe an application layer feature to visually present a set of BT devices paired with the client device; receive a BT frame, in accordance with the BT profile, from the host device, the BT frame to instruct the client device to connect to the second BT host; and connect to a second BT host in response to receipt of the BT frame. Example 37 is the non-transitory computer-readable medium of Example 36, the operations to further establish a link with the second host device in response to receipt of the BT frame. Example 38 is the non-transitory computer-readable medium of Example 36, the visual profile to further describe an application layer feature to visually present a programmable feature of the client device and one or more optional settings for the programmable feature. Example 39 is the non-transitory computer-readable medium of Example 36, the operations to further receive of a host BT profile. Example 40 is the non-transitory computer-readable medium of Example 36, the visual profile to include a list of text descriptions representative of the set of BT devices.

What is claimed is:
1. An apparatus comprising:
a memory; and
processing circuitry of a host device coupled with the memory to:
connect, by the host device with a client device, via a Bluetooth (BT) channel;
receive a BT profile from the client device, the BT profile comprising a visual profile, the visual profile comprising a set of BT devices paired with the client device to describe an application layer feature to visually present the set of BT devices;
present, via a display of the host device, a visual representation of at least active devices of the set of BT devices;
receive user input responsive to the visual representation of the set of BT devices, the user input indicating selection of a second host device from the set of BT devices; and
cause transmission of a BT frame based on the user input indicating the selection of the second host device, in accor- dance with the BT profile, to the client device to cause the client device to connect to the second BT host.

2. The apparatus of claim 1, wherein the processing circuitry comprises baseband processing circuitry and further comprising a radio coupled with the baseband processing circuitry, and one or more antennas coupled with the radio to transmit the BT frame.

3. The apparatus of claim 1, the visual profile to further describe the application layer feature to visually present a programmable feature of the client device and one or more optional settings for the programmable feature.

4. The apparatus of claim 3, wherein the user input comprises a selection of at least one of the one or more of the optional settings.

5. The apparatus of claim 1, the processing circuitry to further present an edit feature, the edit feature, after activation, to change the visual representation of the set of devices paired with the client device.

6. The apparatus of claim 5, wherein the edit feature, after activation, receives another user input to change a description of a paired device in the set of BT devices paired with the client device.

7. The apparatus of claim 1, the processing circuitry to further cause transmission of a host BT profile.

8. The apparatus of claim 1, the visual profile to visually present the set of BT devices paired with the client device by presenting a list of activatable text items, selection of one of the activatable text items to indicate user selection of a first BT device of the set of BT devices.

9. A non-transitory computer-readable medium, comprising instructions, which when executed by a processor, cause the processor to perform operations to:
connect, by a host device with a client device, via a Bluetooth (BT) channel;
receive a BT profile from the client device, the BT profile comprising a visual
profile, the visual profile comprising a set of BT devices paired with the client device to describe an application layer feature to visually present the set of BT devices;
present, via a display of the host device, a visual representation of at least active devices of the set of BT devices;
receive user input responsive to the visual representation of the set of BT devices, the user input indicating selection of a second host device from the set of BT devices; and
cause transmission of a BT frame based on the user input indicating the selection of the second host device, in accordance with the BT profile, to the client device to cause the client device to connect to the second BT host.

10. The non-transitory computer-readable medium of claim 9, the visual profile to further describe the application layer feature to visually present a programmable feature of the client device and one or more optional settings for the programmable feature.

11. The non-transitory computer-readable medium of claim 10, wherein the user input comprises a selection of at least one of the one or more of the optional settings.

12. The non-transitory computer-readable medium of claim 9, the operations to further present an edit feature, the edit feature, after activation, to change the visual representation of the set of devices paired with the client device.

13. The non-transitory computer-readable medium of claim 12, wherein the edit feature, after activation, receives another user input to change a description of a paired device in the set of BT devices paired with the client device.

14. The non-transitory computer-readable medium of claim 9, further comprising causing transmission of a host BT profile.

15. The non-transitory computer-readable medium of claim 9, the visual profile to visually present the set of BT devices paired with the client device by presenting a list of activatable text items, selection of one of the activatable text items to indicate user selection of a first BT device of the set of BT devices.

16. An apparatus comprising:
a memory; and
processing circuitry of a client device coupled with the memory to: connect, by the client device with a host device, via a Bluetooth (BT) channel; transmit a BT profile to a host device, the BT profile comprising a visual profile,
the visual profile comprising a set of BT devices paired with the client device to describe an application layer feature to visually present the set of BT devices;
receive a BT frame, in accordance with the BT profile, from the host device, the BT frame to instruct the client device to connect to a second BT host of the set of BT devices; and
connect to the second BT host in response to receipt of the BT frame.

17. The apparatus of claim 16, wherein the processing circuitry comprises baseband processing circuitry and further comprising a radio coupled with the baseband processing circuitry, and one or more antennas coupled with the radio to receive the BT frame.

18. The apparatus of claim 16, the processing circuitry to further establish a link with the second BT host in response to receipt of the BT frame.

19. The apparatus of claim 16, the visual profile to further describe the application layer feature to visually present a programmable feature of the client device and one or more optional settings for the programmable feature.

20. The apparatus of claim 16, the processing circuitry to further receive of a host BT profile.

21. The apparatus of claim 16, the visual profile to include a list of text descriptions representative of the set of BT devices.

22. A non-transitory computer-readable medium, comprising instructions, which when executed by a processor, cause the processor to perform operations to:
connect, by a client device with a host device, via a Bluetooth (BT) channel;
transmit a BT profile, the BT profile comprising a visual profile, the visual profile comprising a set of BT devices paired with the client device to describe an application layer feature to visually present the set of BT devices;
receive a BT frame, in accordance with the BT profile, from the host device, the BT frame to instruct the client device to connect to a second BT host of the set of BT devices; and
connect to the second BT host in response to receipt of the BT frame.

23. The non-transitory computer-readable medium of claim 22, the operations to further establish a link with the second BT host in response to receipt of the BT frame.

24. The non-transitory computer-readable medium of claim 22, the visual profile to further describe the application layer feature to visually present a programmable feature of the client device and one or more optional settings for the programmable feature.

25. The non-transitory computer-readable medium of claim 22, the visual profile to include a list of text descriptions representative of the set of BT devices.

\* \* \* \* \*